United States Patent [19]

Hirashima et al.

[11] Patent Number: 5,135,253
[45] Date of Patent: Aug. 4, 1992

[54] AIR BAG SYSTEM FOR VEHICLE

[75] Inventors: Isao Hirashima, Hiroshima; Hisao Muramoto, Yamaguchi; Shigefumi Kohno, Hiroshima; Haruhisa Kore, Kure, all of Japan

[73] Assignee: Mazda Motor Corporation, Hiroshima, Japan

[21] Appl. No.: 526,882

[22] Filed: May 22, 1990

[30] Foreign Application Priority Data

May 24, 1989 [JP] Japan ............................ 1-59174[U]
May 24, 1989 [JP] Japan ............................ 1-59175[U]
May 24, 1989 [JP] Japan ............................ 1-129005

[51] Int. Cl.⁵ .............................................. B60R 21/16
[52] U.S. Cl. ................................................ 280/732
[58] Field of Search ............ 280/732, 728, 730, 743, 280/752; 180/90

[56] References Cited

U.S. PATENT DOCUMENTS

| | | | |
|---|---|---|---|
| 3,643,971 | 2/1972 | Kushnick | 280/732 |
| 3,708,179 | 1/1973 | Hulten | 280/732 |
| 3,930,664 | 1/1976 | Parr et al. | 280/743 |
| 4,432,565 | 2/1984 | Suzuki et al. | 180/90 |
| 4,759,568 | 7/1988 | Paefgen et al. | 280/752 |
| 4,834,421 | 5/1989 | Körber et al. | 280/732 |
| 4,895,389 | 1/1990 | Pack, Jr. | 280/732 |
| 4,925,209 | 5/1990 | Sakurai | 280/743 |

FOREIGN PATENT DOCUMENTS 2425659 12/1975 Fed. Rep. of Germany ...... 280/732
76344 5/1983 Japan .................................. 280/732

Primary Examiner—Charles A. Marmor
Assistant Examiner—Tamara L. Graysay
Attorney, Agent, or Firm—Fleit, Jacobson, Cohn, Price, Holman & Stern

[57] ABSTRACT

An air bag system includes an instrument panel provided with an opening in the vicinity of a passenger seat. An air bag unit, disposed in the opening is provided with an air bag and a casing for receiving the air bag. A cover member is provided on the instrument panel so as to cover the opening in such a manner that the cover member extends continuous to a surface of the instrument panel. A shelf portion is formed, on the instrument panel, to extend toward a passenger seated in the passenger seat. The cover member is provided with a weakened portion to be broken, with an upper portion thereof being opened upwardly and a lower portion thereof being opened downwardly, like a double door, when the air bag is inflated. The shelf portion is slightly extended beyond the lower portion of the cover member when the lower portion is opened. With this construction, a safe air bag system can be obtained with a compact structure.

10 Claims, 10 Drawing Sheets

AIR BAG SYSTEM FOR VEHICLE

BACKGROUND OF THE INVENTION

1. Field of the Invention

This invention relates to an air bag system for a vehicle.

2. Description of the Related Art

Conventionally, there has been known an automobile equipped with an air bag system as a safety device for a passenger in which the passenger is prevented from being injured in case of a collision thereof. For example, Japanese Utility Model Public Disclosure No. 58-23756, laid open to the public in 1983, discloses an air bag system provided with an air bag unit including an air bag and an inflater for generating gas by which the air bag is inflated. The air bag unit is disposed in an opening formed on an instrument panel close to the passenger's seat. In the air bag system, the inflater is actuated to produce the gas to develop the air bag for protecting the head and the breast of the passenger when a collision occurs. Around the opening is provided a cover member which is continuous from a surface of the instrument panel. The cover member is opened as the air bag is inflated.

It has been proposed that the cover member be provided with a weakened portion, extending horizontally so as to be broken and opened like a double door in the vertical direction as the air bag is inflated.

It should be noted that in this structure, a lower portion of the cover member is developed toward a passenger seated on the passenger's seat.

This structure is disadvantageous in that the lower portion of the cover member, when opened, may hit a passenger, such as a child standing in front of the passenger's seat. In order to prevent the opened lower portion of the cover member from hitting the passenger, a shelf portion may be provided to project from the instrument panel toward the passenger, as proposed in the Japanese Utility Model Public Disclosure No. 58-23756.

It should however be noted that the structure as proposed in the Japanese Utility Model Public Disclosure No. 58-23756 is expanded in a passenger compartment to reduce the space thereof.

In addition, free design for the instrument panel is deteriorated.

SUMMARY OF THE INVENTION

An object of the invention is, therefore, to provide an air bag system which can prevent the cover member from hitting the passenger as the cover member is opened.

Another object of the invention is to provide an air bag system in which the shelf portion of the instrument panel is made as small as possible.

The above object of the invention can be accomplished by an air bag system comprising an instrument panel provided with an opening in the vicinity of passenger's seat, an air bag unit disposed in the opening and provided with an air bag and a casing for receiving the air bag, a cover member provided on the instrument panel so as to cover the opening in a manner such that the cover member extends continuously with a surface of the instrument panel, and a shelf portion formed on the instrument to extend toward a passenger seated in the passenger's seat. The cover member is being provided with a weakened portion to be broken, with an upper portion thereof being opened upwardly and a lower portion thereof being opened downwardly like a double door when the air bag is inflated. The shelf portion is slightly extended beyond the lower portion of the cover member when the lower portion is opened. In one aspect of the present invention, the lower portion of the cover member may be smaller than the upper portion of the cover member in width so that the lower portion of the cover member is not projected beyond the shelf portion even when the cover member is opened.

In another aspect of the present invention, the lower portion of the cover member is folded as it is opened so that the lower portion of the cover member is not projected from the shelf portion formed on the instrument panel as the air bag is inflated thus, the cover member is extended.

In still another aspect of the present invention, the lower portion is moved away from the passenger as it is opened. In other words, the lower portion of the cover member is moved inward of a space defined by the instrument panel.

According to the present invention, the cover member is not extended beyond the instrument panel when the cover member is opened so that the cover member, and specifically, the lower portion thereof does not hit the passenger even when he stands close to the instrument panel. It should be noted that the cover member is usually disposed in an oblique attitude to be extended forwardly upwardly. Therefore, the upper portion of the cover member may not affect the passenger as it is extended when the air bag is inflated in the collision.

With this structure, the shelf portion of the instrument panel can be constituted to project toward the passenger as little as possible. Thus, the instrument panel can be designed to provide the passenger compartment with enough space to improve riding comfort.

DESCRIPTION OF THE PREFERRED EMBODIMENT

Figure 1:
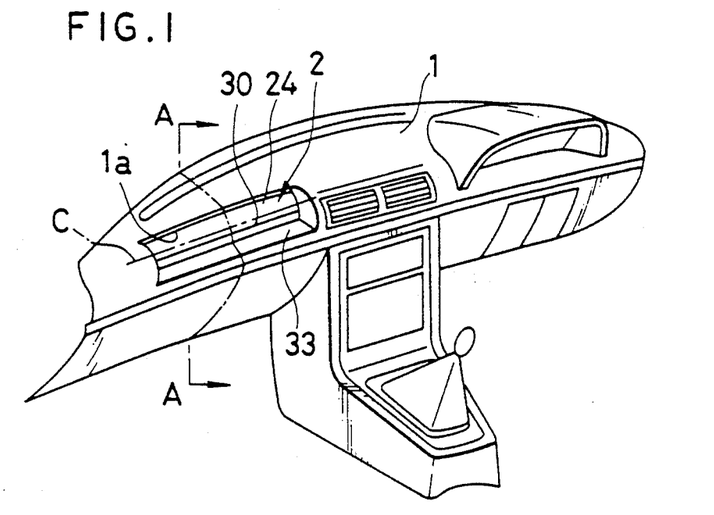
FIG. 1 is a perspective view of a front portion of a passenger compartment of a vehicle to which the present invention can be applied.

FIG. 1 is a perspective view showing a front inside view of a passenger compartment of a vehicle to which the present invention can be applied.

An instrument panel 1 is arranged to partly define a front portion of a passenger compartment of the vehicle. The instrument panel 1 is formed with an opening 1a extending transversely of the vehicle. The opening 1a is located in the vicinity of a passenger seat. An air bag system 2 is incorporated in the front portion of the passenger compartment adjacent to the opening 1a.

Figure 2:
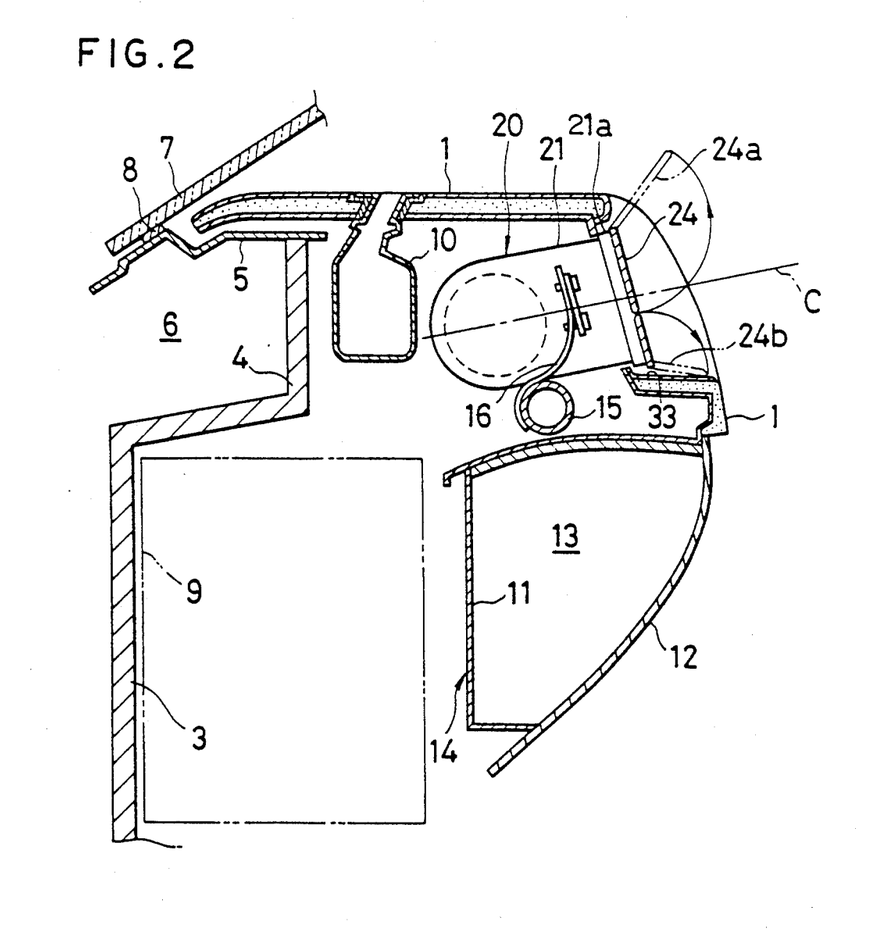
FIG. 2 is a sectional view along line A—A of FIG. 1.

As shown in FIG. 2, a dash lower panel 3 is disposed at a rear end of an engine room of the vehicle. A dash upper panel 4 is connected with an upper end of the dash lower panel 3. A cowl upper panel 5 is connected with an upper end of the dash upper panel 4 at a ear end thereof. A cowl front panel (not shown) is connected with both a front end of the cowl upper panel 5 and the dash upper panel 4 to define a cowl box 6 forming a closed cross sectioned structure extending transversely.

A front windshield glass 7 is secured to the cowl upper panel 5 by means of an adhesive 8.

A cooling unit 9, such as an air conditioner is disposed rearward of the dash lower panel 3 and under the dash lower panel 4. Thus, the cooling unit 9 is located in a space defined by the instrument panel 1.

A defroster nozzle 10 is disposed beneath a top deck of the instrument panel 1. The defroster nozzle 10 supplies an air from the cooling unit toward the front windshield glass 7 so as to demist the glass.

A glove compartment 14 is defined by a glove tray 11, a glove lid 12 and a glove pocket 13 rearward of the cooling unit 9.

A steering support member 15 is arranged rearward of and above the cooling unit 9. The steering support member 15 extends transversely and is connected with hinge pillars (not shown) at opposite ends thereof through brackets (not shown). Between a central portion of the steering support member 15 and a floor tunnel portion is a reinforcement extending in an up and down direction to constitute a T-shaped steering support structure.

To the steering support member 15 is fixed a bracket 16 on which an air bag unit 20 of the air bag system 2 is mounted.

Figure 3:
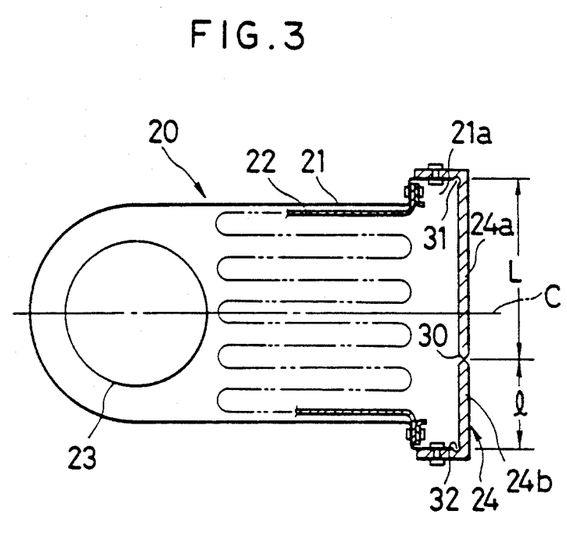
FIG. 3 is a sectional view of an air bag unit of FIG. 2.

As shown in FIG. 3, the air bag unit 20 is provided with a casing 21 having an opening 21a opening toward the passenger seat, an air bag 22 stored in the casing 21 in a folded condition, a gas inflater 23, a lid 24 as a cover member covering an upper portion of the casing 21. The lid 24 is arranged to be continuous with a surface of the instrument panel 1 so that it appears as if the lid 24 constitutes a part of the instrument panel 1.

Figure 4:
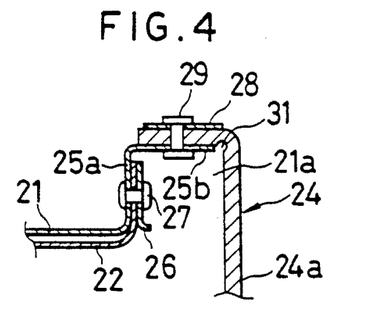
FIG. 4 is a partially sectional view of the air bag unit specifically showing a joint portion of a cover member.

The casing 21, as clearly shown in FIG. 4, is provided with an annular portion 25a and cylindrical portion 25b. A peripheral portion of the air bag 22 is mounted on the annular portion 25a through rivets 27 and the peripheral portion is urged against the annular portion 25a by means of a retaining plate 26.

The lid 24 is formed with a weakened portion 30 extending horizontally thereacross. The weakened portion 30 is offset downwardly with regard to a horizontal center line C. When the air bag is inflated, the lid 24 is broken along the weakened portion 30 to be opened wherein an upper portion 24a thereof is swung upwardly and a lower portion 24b thereof is swung downwardly.

The lid 24 is formed with notch portions at an upper end and a lower end so as to constitute hinged portions 31 and 32 about which the upper portion 24a and the lower portion 24b are swung respectively Since the weakened portion 30 is formed lower than the center line C, a distance between the weakened portion 30 and the lower hinged portion 32 is smaller than a distance between the weakened portion 30 and the upper hinged portion L. The instrument panel 1 is provided with a shelf portion 33 expanded beyond the lower portion 24b when opened. In other words, an extension by the shelf portion of the instrument panel 1 is slightly greater than the width 1 of the lower portion 24b.

In operation, when a collision occurs in the vehicle, a collision sensor (not shown) detects the collision. Then, an igniter is caused to fire a chemical composition in the inflater 23 by which a gas is produced so that the air bag is inflated. Thus, the passenger is prevented from being injured since his head and/or breast hit the air bag as inflated.

As shown in FIG. 2, at an initial stage of the inflation of the air bag, the lid 24 is broken at the weakened portion 30 to be divided into the upper portion 24a and the lower portion 24b when an inflating force of the air bag acts on the lid 24. The upper portion 24a and the lower portion 24b are opened like a double door. In this case, since the width 1 of the lower portion 24b is smaller than the extension of the shelf portion of the instrument panel 1, the lower portion 24b does not project beyond the instrument panel 1 toward the passenger. Thus, even if the passenger stands just rearward of the instrument panel 1, the passenger is not affected by the movement of the lid 24. Meanwhile, the movement of the upper portion 24a does not affect the passenger since the upper portion 24a is swung away from the passenger as it is opened. This is because the lid 24 is arranged slightly upwardly and forwardly.

Figure 5:
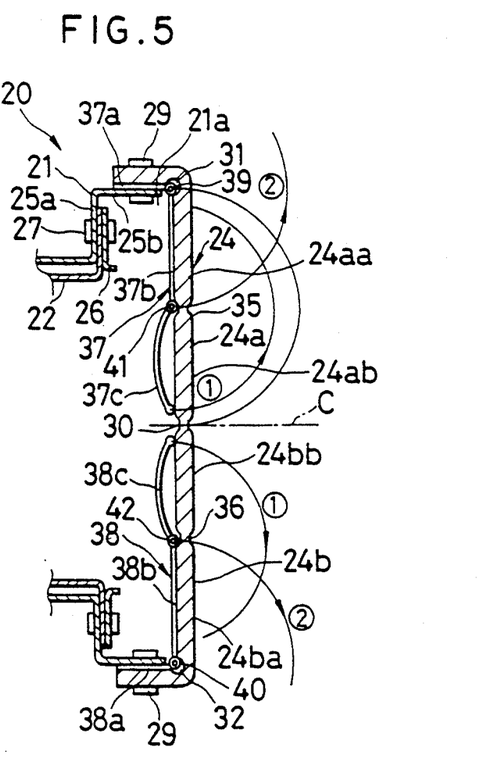
FIG. 5 is a partially sectional view similar to FIG. 4 but showing another embodiment.

Hereinafter, there is described another embodiment of the present invention, making reference with FIG. 5.

The same components as the former embodiment are referred to the same numerals, and a detailed explanation thereof will be omitted.

The upper portion 24a and lower portion of the lid 24 are formed with weakened portions, 35 and 36 at intermediate portions respectively. The weakened portions 35 and 36 are adapted to function as hinged portions for the upper portion 24a and the lower portion 24b respectively. The upper portion 24a is divided by the weakened portion 35 into a first portion 24aa as an upper portion with regard to the weakened portion 35 and a second portion 24ab as a lower portion. The lower portion 24b is divided by the weakened portion 36 into a first portion 24ba as a lower portion with regard to the weakened portion 36 and a second portion 24bb as an upper portion.

Link members 37 and 38 are provided at back sides or insides of the upper portion 24a and the lower portion 24b. The link members 37 and 38 are provided with base portions 37a and 38a secured between the cylindrical portion 25b of the casing 21 and a flange portion or the peripheral portion of the lid 24, arm portions 37b and 38b pivotally connected with first ends of the base portions 37a and 38a through hinge portions 39 and 40 and extending along the first portions 24aa and 24ba of the upper portion 24a and the lower portion 24b, and urging portions 37c and 38c pivotally connected with first ends of the arm portions 37b and 38b through hinge portions 41 and 42 and disposed at back sides of the second portions 24ab and 24bb of the upper portion 24a and the lower portion 24b.

The urging portion 37c of the link member 37 urges the second portion 24a or the lower portion of the upper portion 24a to swing in the counterclockwise direction about the hinge portion 35. On the other hand, the urging portion 38c of the link member 38 urges the second portion 24bb or the upper portion of the lower portion 24b to swing in the clockwise direction about the hinge portion 36. The shelf portion 33 projected toward the passenger seated on the passenger seat slightly greater than a tip end of the first portion 24ba when the first portion is opened to be extended along an upper surface of the self portion.

In other words, an extension by the shelf portion of the instrument panel 1 is slightly greater than the first portion 24ba or the lower portion of the lower portion 24b.

In operation, at an initial stage of inflation of the air bag, the lid 24 is broken at the weakened portion 30 to be divided into the upper portion 24a and the lower portion 24b when an inflating force of the air bag acts on the lid 24. In this case, the second portion 24ab of the upper portion 24a is swung around the hinge portion 35 by virtue of the urging portion 37c of the link member 37 to fold the upper portion 24a as shown by an arrow ① in FIG. 5. The second portion 24bb of the lower portion 24b of the lower portion 24b is swung around the hinge portion 36 by virtue of the urging portion 38c of the link member 38 to fold the lower portion 24b, as shown by an arrow ①. As the upper portion 24a and the lower portion 24b of the lid 24 are folded, respectively, they are also opened like a double door as shown in FIG. 5 by an arrow ②. Since the first portion 24ba is smaller than the projected length of the shelf portion of the instrument panel and the lower portion 24b is folded as it is opened, the lid 24 does not affect the passenger when the air bag system is operated, even if he stands close to the instrument panel.

Figure 6:
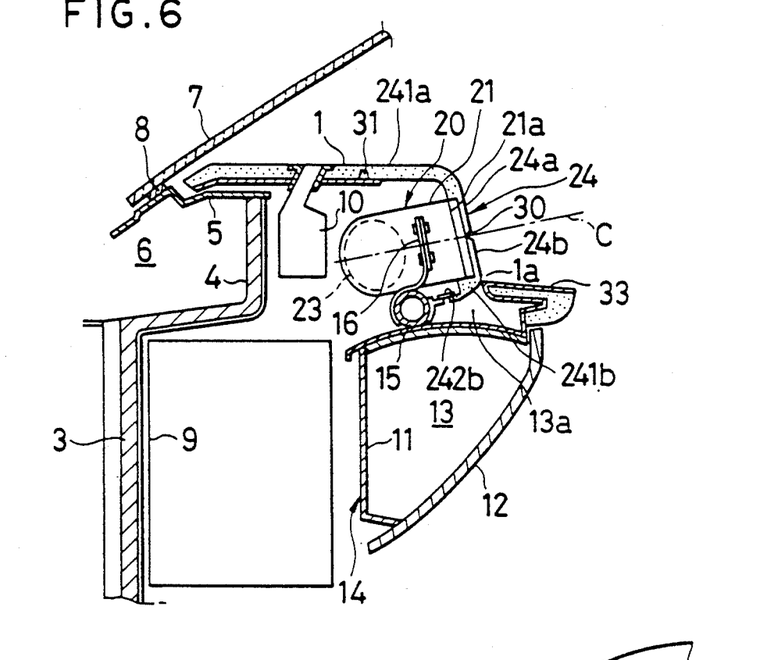
FIG. 6 is a sectional view similar to FIG. 2 but showing still another embodiment.
Figure 7:
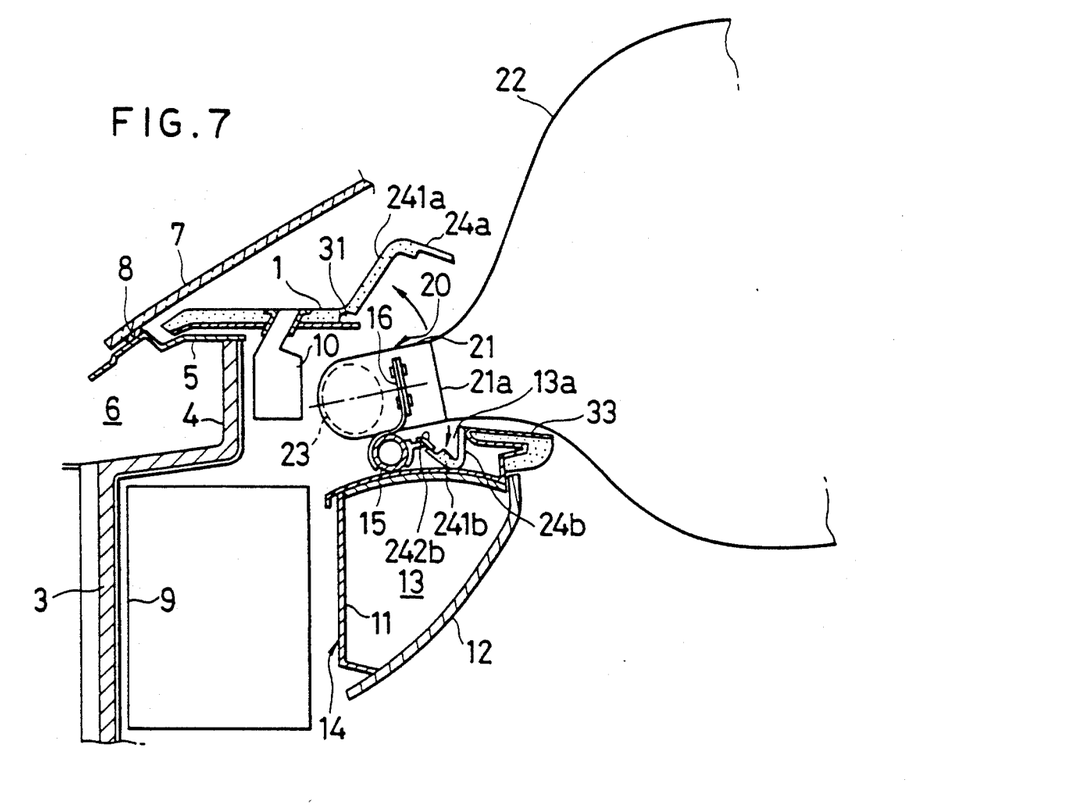
FIG. 7 is a sectional view showing a condition after the air bag system shown in FIG. 6 has operated.

Referring to FIGS. 6 and 7, there is shown still another embodiment of the present invention.

In this embodiment, the lid 24 is integrally formed with the instrument panel. The lid 24 is formed substantially continuously with the outer surface of the instrument panel 1. The weakened portion 30 is formed in alignment with the center line C as shown in FIG. 6. The upper portion 24a is extended upwardly and forwardly from the weakened portion 30. The upper portion 24a continues to a horizontal portion 241a which extends forwardly horizontally. The horizontal portion 241a terminates in a notch 31 at which the upper portion 24a can make a swingable movement integrally with the horizontal portion 241a in the counterclockwise direction as it is subjected to an inflating force of the air bag unit 22 as shown in FIG. 7.

The lower portion 24b of the lid 24 is extended rearwardly and downwardly and continues to a support portion 241b, which is extended substantially forwardly and horizontally from a lower end of the lower portion 24b. The support portion 241b is formed integrally with the lower portion 24b. The support portion 241b is connected with the steering support member 15 through a flexible member 242b so that the lower portion 24b of the lid can make a swingable movement about a connecting point between the steering support member 15 and the support portion 241b integrally with the support portion 241b in a clockwise direction.

In this embodiment, there is provided a space 13a inside of the shelf portion 33 so that the lower portion 24b can be swung toward the space 13a to be received therein as shown in FIG. 7 when opened in a case in which the inflating force of the air bag unit 22 acts thereon. Thus, the lower portion 24b of the lid 24 is not projected beyond the shelf portion 33 as the lid 24 is opened.

Figures 8, 9:
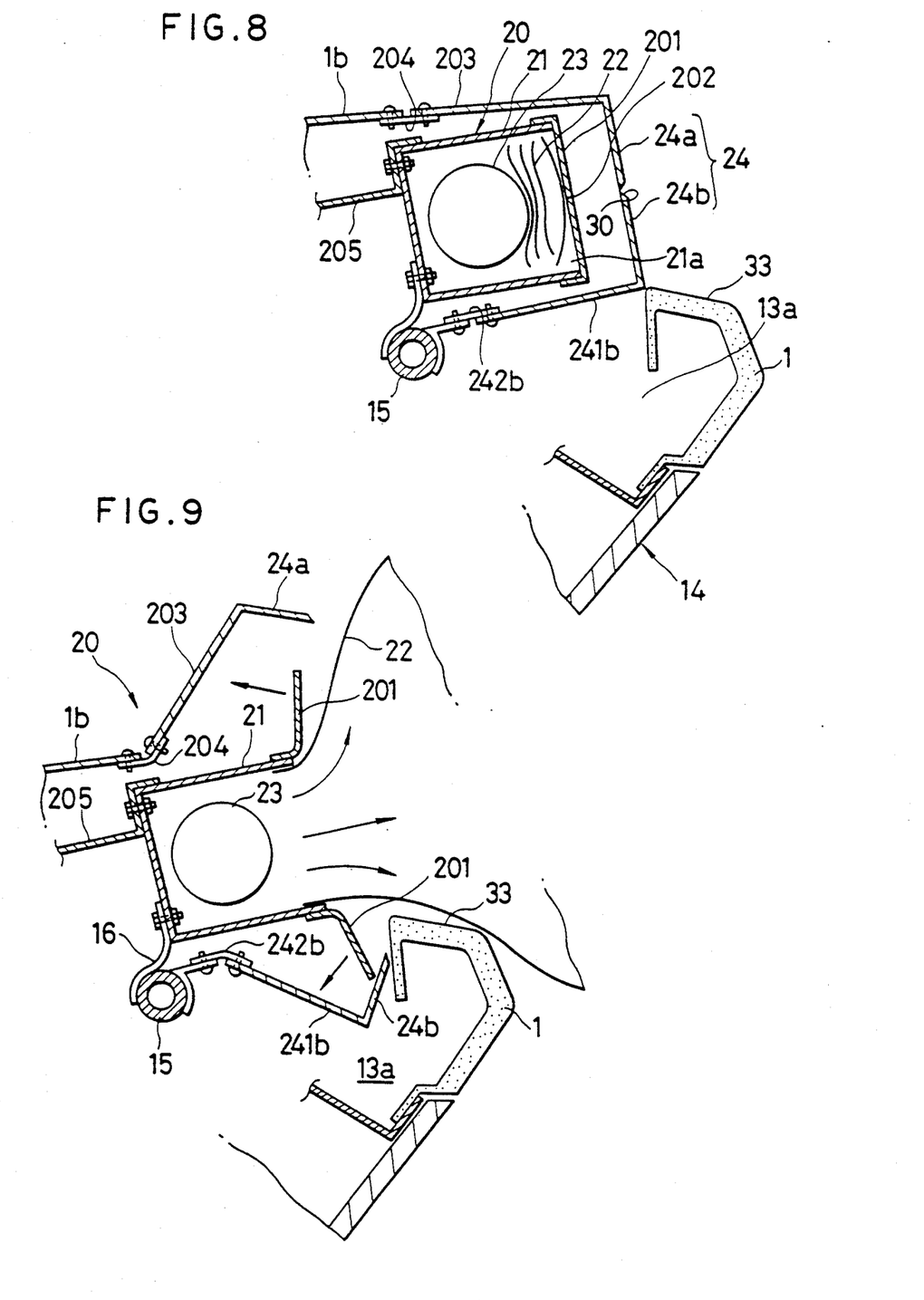
FIG. 8 is a sectional view similar to FIG. 6 but showing yet another embodiment.
FIG. 9 is a sectional view showing a condition after the air bag system shown in FIG. 8 has operated.

Referring to FIGS. 8 and 9, still another embodiment of the present invention is illustrated.

In this embodiment, the casing 21 is provided with a flexible cover 201. The cover 201 is formed with a weakened portion 202.

The upper portion 24a is formed integrally with a support portion 203 extending substantially forwardly and horizontally from the upper end of the upper portion 24a. A forward end of the support portion 203 is connected to a horizontal portion 1b of the instrument panel 1, constituting an upper deck thereof, through a flexible member 204. The casing 21 is also supported by a supporting plate 205.

In operation, when the inflating force is applied thereto, the cover 201 is broken at the weakened portion 202 and divided into two pieces in an up and down direction to be opened like a double door as shown in FIG. 9. Likewise, the lid 24 is fractured at the weakened portion 30 as it is subjected to the inflating force from the air bag 22 so that the lid 24 is opened like double doors. In this case, the upper portion 24a is swung upwardly or in the counterclockwise direction by virtue of the flexible member 204 which provides the upper portion with a pivotal axis while the lower portion 24b is swung downwardly or in the clockwise direction by virtue of the flexible member 242b which provides the lower portion 24b with a pivotal axis. It will be understood that both the lower portion 24b of the lid 24 and the lower portion of the cover 201 are swung toward the space 13a defined by the instrument panel 1 so as to be received therein. With this structure, the air bag unit 20 is provided with the cover 201 independently to facilitate handling.

Figures 10, 11:
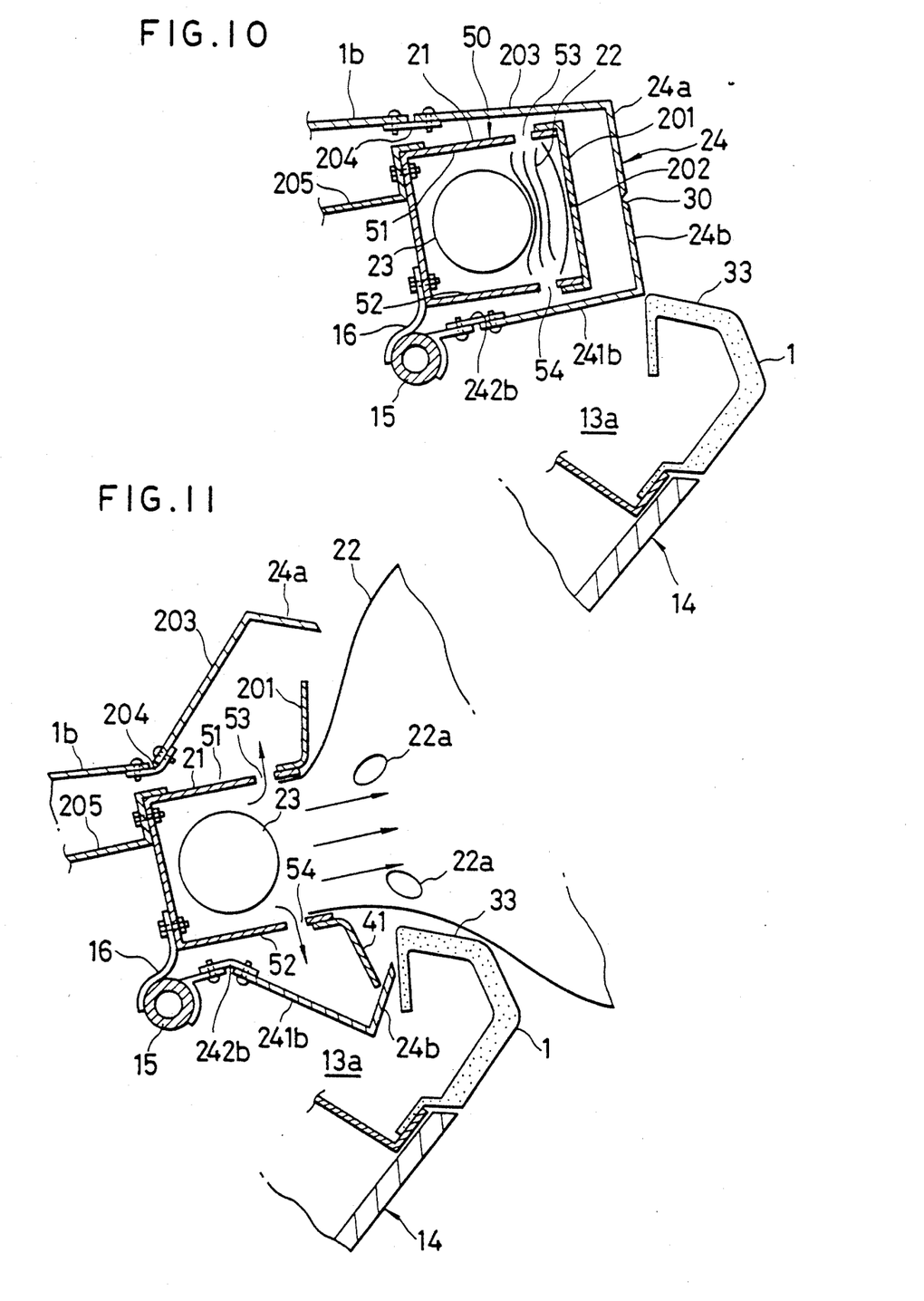
FIG. 10 is a sectional view similar to FIG. 8 but showing still another embodiment.
FIG. 11 is a sectional view showing a condition after the air bag system shown in FIG. 10 has operated.

Referring to FIGS. 10 and 11, a further embodiment of the present invention is illustrated. The casing 21 is formed with openings 53 and 54 in upper and lower surfaces 51 and 52, respectively. In operation, the gas from the inflator 23 is introduced toward the support portions 203 and 241b of the lid 24 from the inside of the air bag unit 20 through the openings 53 and 54 as it is led to the cover 201. Thus, the lid 24 can be easily opened by virtue of the gas introduced thereto through the openings 53 and 54. Thus, the lid 24 can be opened quickly and surely.

This structure is also advantageous in that the inflated air bag 22 can be quickly shrunk since the gas in the air bag 22 can be discharged through the openings 53 and 54 as well as bent holes 22a.

With this structure, it is desirable that the inflator 23 be provided with a capacity large enough to compensate the quantity of gas supplied through the opening 53 and 54.

Figures 12, 13:
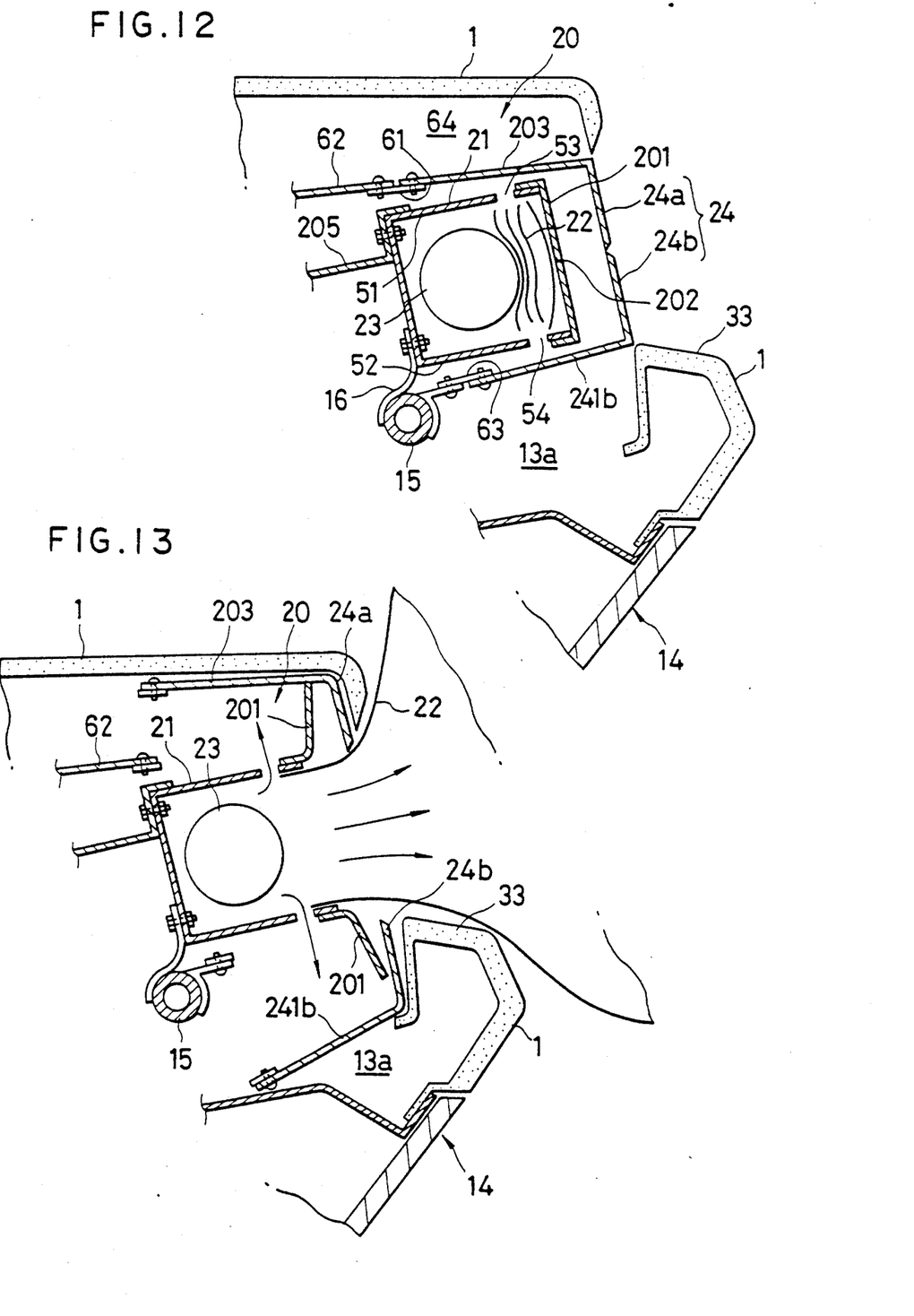
FIG. 12 is a sectional view similar to FIG. 10 but showing a further embodiment.
FIG. 13 is a sectional view showing a condition after the air bag system shown in FIG. 12 has operated.

Referring to FIGS. 12 and 13, there is shown a still further embodiment of the present invention.

In this embodiment, although the lid 24 is incorporated into the opening 1a of the instrument panel 1 with the outer surface of the lid 24 continuous to the outer surface of the instrument panel 1, the lid 24 is constituted by a separate member from the instrument panel 1. The support portion 203 of the upper portion 24a of the lid 24 is connected with a support plate 62 through a weak member 61 which can be broken in a case in which a stress is applied thereto beyond a predetermined value. The support member 62 is connected to the instrument panel 1, the dash upper panel, or the like. The support portion 241b of the lower portion 24b of the lid 24 is also connected with the steering support member 15 through a weak member 62 similar to the weak member 61. There is provided a space 64 above the support portion 203 of the upper portion 24a and under the instrument panel 1.

In operation, the gas from the inflator 23 is introduced toward the lid 24 through the opening 53 and 54 so that the inflating force of the gas is applied to the support portions 203 and the 241b. The lid 24 is fractured at the weakened portion 30. At the same time, the weak members 61 and 63 are broken so that the upper portion 24a and lower portion 24b are separated from the support plate 62 and the steering support member 15, respectively.

The separated upper portion 24a together with the support portion 203 is received in the space 64 while the separated lower portion 24b together with the support portion 241b is received in the space 13a formed under the air bag unit 22. In other words, the lid 24 is retained in the space defined by the instrument panel 1 so that the safety of the air bag system can be improved.

Figures 14, 15:
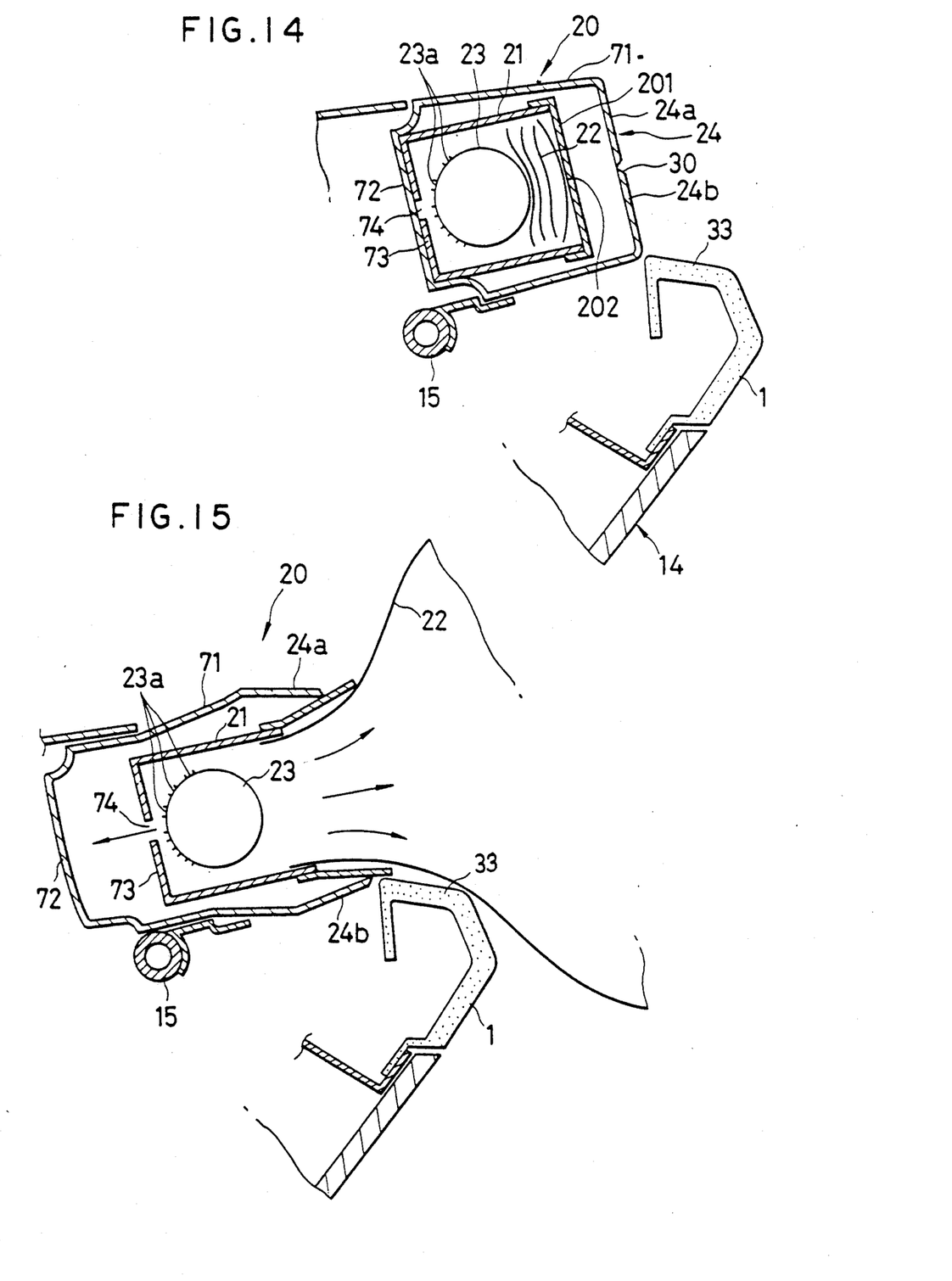
FIG. 14 is a sectional view similar to FIG. 12 but showing still another embodiment.
FIG. 15 is a sectional view showing a condition after the air bag system shown in FIG. 14 has operated.

Referring to FIGS. 14 and 15, yet another embodiment is illustrated.

In this embodiment, the lid 24 is incorporated into a casing 71 of a box-like configuration which is separated from the instrument panel 1. A wall portion 72 of the casing 71 located opposite to the lid 24 is removably secured to a wall portion 73 of the casing 21 through an appropriate joint member, such as an adhesive, a screw and the like. This joint member is broken or ruptured as it is subjected to a stress beyond a predetermined value so that the casing 71 is separated from the casing 21 to be moved forwardly as a whole. The wall portion 73 of the casing 21 is formed with an opening 74. In this structure, gas holes 23a of the inflator 23 is desirably formed facing to the opening 74. It is preferable that a filter is provided for screening the gas from the inflator 23.

In operation, on operating the inflator 23 in the case of collision, a gas pressure from the inflator 23 is applied to the wall portion 72 of the casing 71 with a value greater than the predetermined value so that the casing 71 is separated from the casing 21 and is moved forwardly. As a result, the lid 24 is prevented from being projected beyond the shelf portion 33 of the instrument panel 1 when the lid 24 is fractured at the weakened portion 30 to be opened like a double door with the upper portion 24a being swung upwardly and the lower portion 24b being swung downwardly as shown in FIG. 15. This is because the casing 71 is retracted from the instrument panel 1 in operation.

Figure 16:
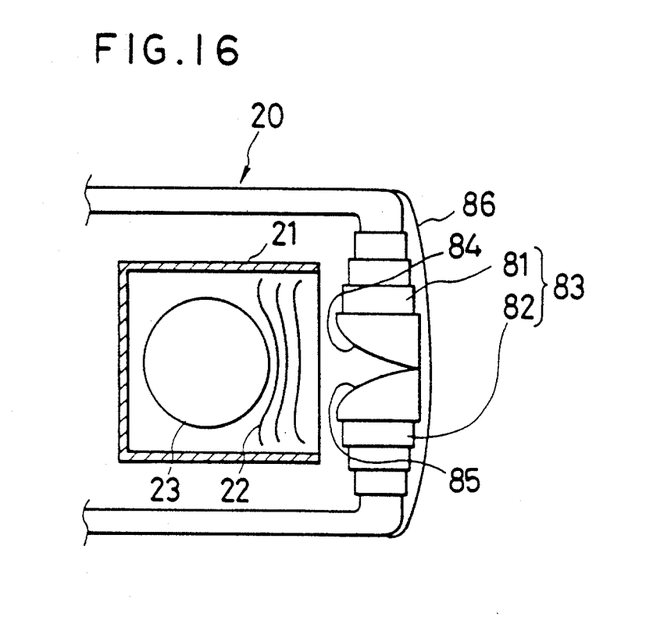
FIG. 16 is a sectional view similar to FIG. 14 but showing still another embodiment.
Figure 17:
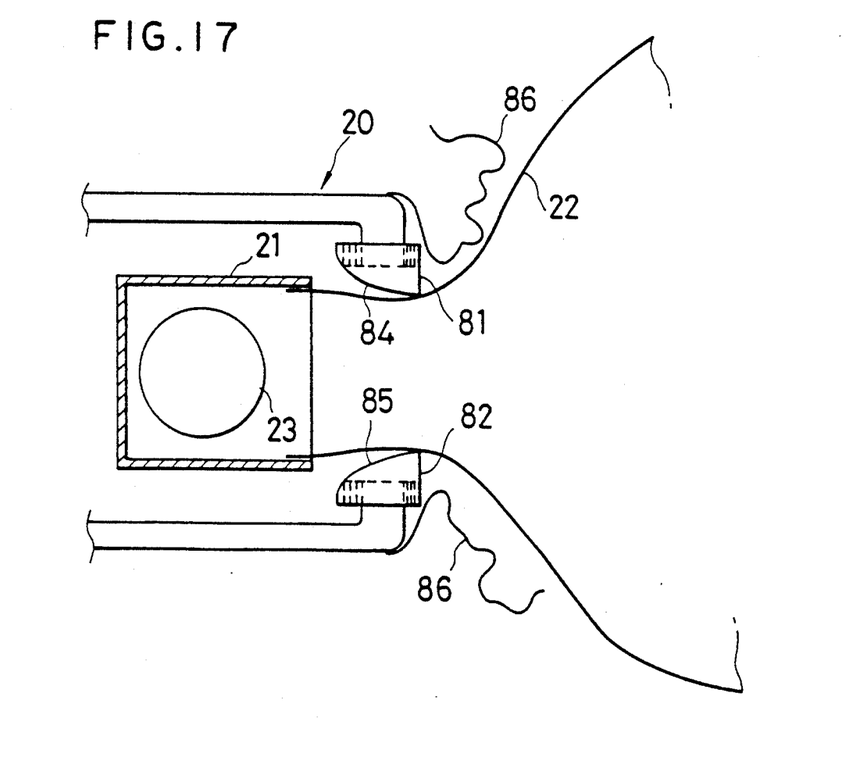
FIG. 17 is a sectional view showing a condition after the air bag system shown in FIG. 16 has operated.

Referring to FIGS. 16 and 17, still another embodiment of the present invention is illustrated.

The air bag unit 20 is provided with a cover member 83 having a telescopic upper portion 81 and a telescopic lower portion 82. The upper and lower portions 81 and 82 are urged resiliently against each other to keep the cover member 83 at a closed position. The upper portion 81 is provided with an inclined surface 84 extending forwardly and upwardly from a tip end or lower end thereof. Likewise, the lower portion 82 is provided with an inclined surface 85 oriented forwardly and downwardly from a tip end or upper end thereof. Thus, the upper portion 81 is engaged with the lower portion 82 at the tip ends thereof to keep the cover member 83 in the closed position. The inclined surfaces 84 and 85 extend away from each other from the engaging point thereof to define a substantially V-shaped space in front of the cover member 83. The cover member 83 is preferably covered by a sheet member 86 made of the same material as the instrument panel 1.

In operation, as the air bag 22 is inflated, the air bag is brought into contact with the inclined surfaces 84 and 85 so that the upper and lower portions 81 and 82 are urged upwardly and downwardly, respectively, because of the inclination of the forward surfaces thereof. Thereafter, the upper and lower portions 81 and 82 are retracted upwardly and downwardly, respectively, to open the cover member 83 as shown in FIG. 17. At the same time, the sheet member 86 is ruptured because of the inflating force of the air bag 22. According to the structure illustrated in this embodiment, the cover member 83 can be opened without a substantial movement toward the passenger so that the operation of the cover member does not affect the passenger even if he stands close to the instrument panel 1 and the cover member 83 of the air bag unit 20.

Figure 18:
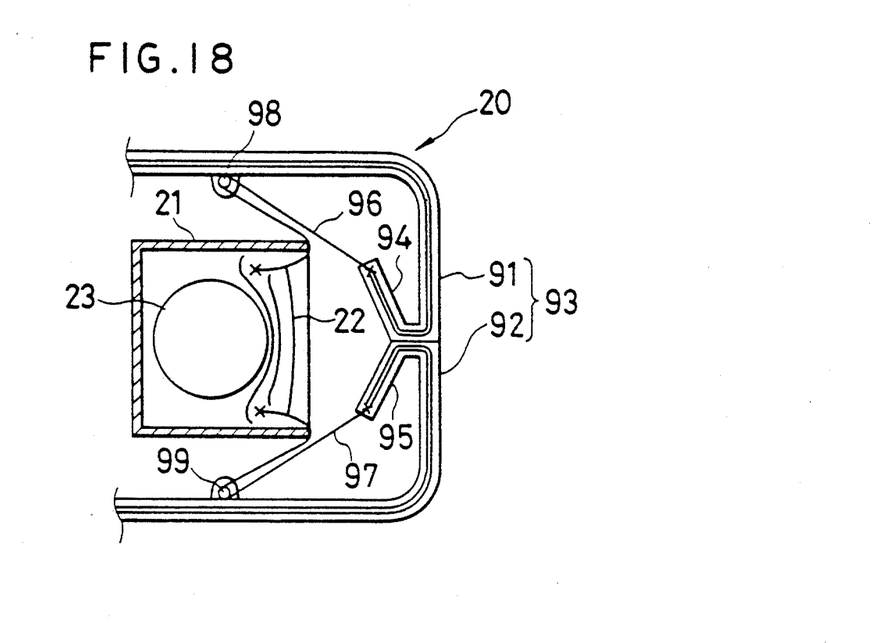
FIG. 18 is a sectional view similar to FIG. 16 but showing yet another embodiment.
Figure 19:
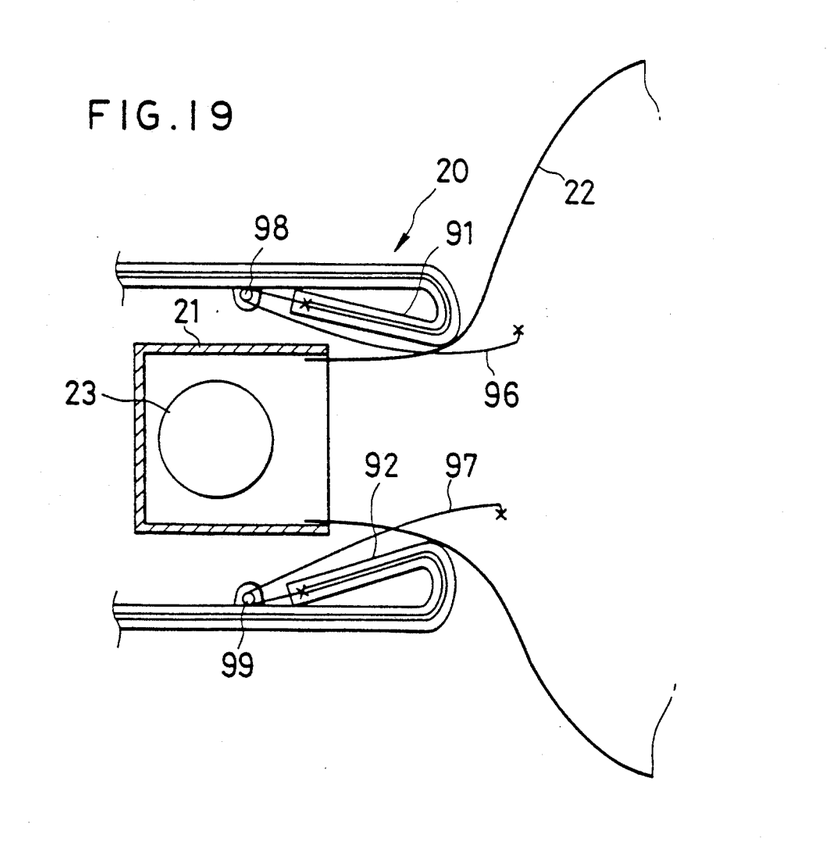
FIG. 19 is a sectional view showing a condition after the air bag system shown in FIG. 18 has operated.

Referring to FIGS. 18 and 19, yet further embodiment of the present invention is illustrated.

The cover member 93 of this embodiment is provided with an upper and a lower portions 91 and 92 made of a soft or flexible material. The upper portion 91 is formed with a folded portion at a lower end with the folded portion extending forwardly or inwardly of the instrument panel 1. The lower portion 92 is formed with a folded portion at an upper end with the folded portion extending forwardly or inwardly of the instrument panel 1. The folded portions of the upper and lower portions 91 and 92 are engaged with each other. Preferably, the folded portions of the upper and lower portions 91 and 92 are joined by an adhesive. The upper portion 91 is provided with an extension 94 extending forwardly and upwardly from a forward end of the folded portion thereof. Likewise, the lower portion 92 is provided with an extension 95 extending forwardly and downwardly from a forward end of the folded portion thereof. A tip end of the extension 94 of the upper portion 91 is connected with the air bag 22, folded and received in the casing 21 through a wire 96. Likewise, a tip end of the extension of the lower portion 92 is connected with the air bag 22 through a wire 97. In this case, the wires 96 and 97 are extended through hooks 98 and 99 mounted on inside of the upper portion 91 and the lower portion 92 and connected with the air bag 22.

With this structure, the tip ends of the extensions 94 and 95 of the upper and lower portions 91 and 92 are pulled toward the hooks 98 and 99 through the wires 96 and 97, respectively, as the air bag 22 is inflated so that the cover member 93 is opened as shown in FIG. 19. According to the present embodiment, the upper and lower portions 91 and 92 of the cover member 93 are drawn into the space defined by the instrument panel 1. Thus, the same result as in the former embodiment can be obtained.

Figure 20:
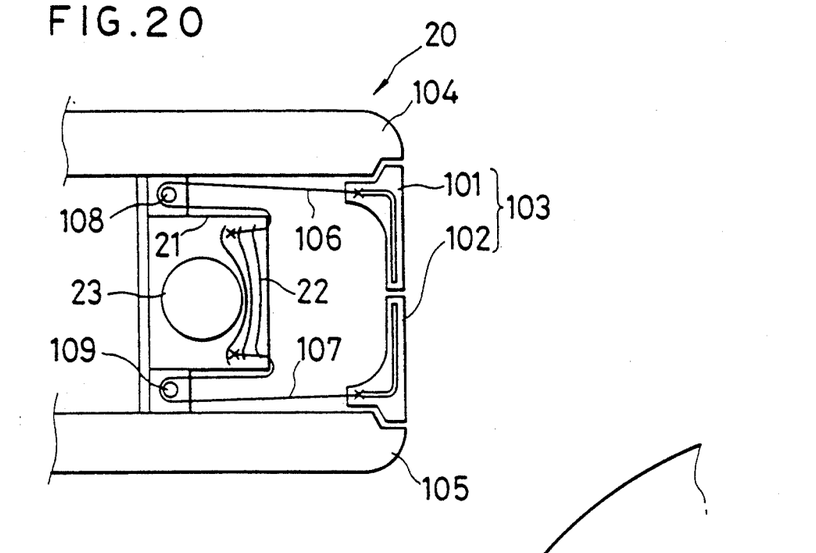
FIG. 20 is a sectional view similar to FIG. 18 but showing still another embodiment.
Figure 21:
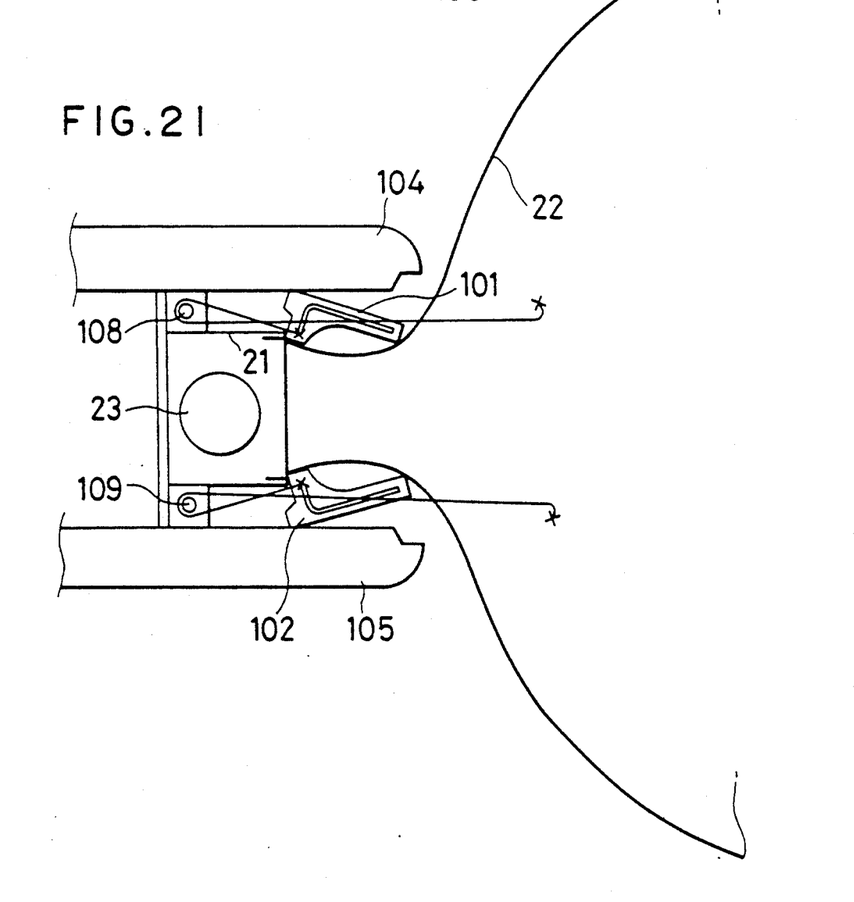
FIG. 21 is a sectional view showing a condition after the air bag system shown in FIG. 20 has operated.

Referring to FIGS. 20 and 21, still another embodiment is illustrated.

The cover member 103 of this embodiment is provided with upper and lower portions 101 and 102 made of a rigid material. The upper portion and lower portion 101 and 102 are joined with each other at a center by tip ends thereof.

However, the upper portion 101 and lower portion 102 can be separated when a stress beyond a predetermined value is applied thereto. Although the cover member 103 is constituted by separate members from the instrument panel 1 or support members 104 and 105, outer surfaces of the upper portion 101 and lower portion 102 of the cover member 103 are continuous to those of the support members 104 and 105 as if they are formed integrally.

The upper portion 101 is connected with a wire 106 at an upper end portion thereof. Likewise, the lower portion 102 is connected with a wire 107 at a lower end portion thereof. The wires 106 and 107 are extended through hooks 108 and 109 and connected with the air bag 22 at the other ends. The hooks 108 and 109 are located on opposite sides of the casing with regard to the up and down direction and close to a front end of the casing 21. Thus, the wires 106 and 107 are extended forwardly from the upper and lower portions 101 and 102, inverted at the hooks 108 and 109 and extended rearwardly from the hooks 108 and 109 and connected with the air bag 22. With this structure, the upper end and the lower end of the upper and lower portions 101 and 102 are pulled forwardly toward the hooks 108 and 109 through the wires 106 and 107, respectively, as the air bag 22 is inflated. At the same time, tip end portions of the upper and lower portions 101 and 102 are pushed rearwardly by the air bag 22. As the air bag 22 is inflated, the upper and lower end portions of the upper and lower portions 101 and 102 are pulled forwardly or retracted from the support members 104 and 105, respectively, and the tip ends of the upper and lower portions 101 and 102 are opened as shown in FIG. 21. According to the present embodiment, the upper and lower portions 101 and 102 of the cover member 103 are drawn into the space defined by the instrument panel 1. Thus, the passenger is not affected by the operation of the air bag system.

What is claimed is:
1. An air bag system comprising:
   an instrument panel provided with an opening in the vicinity of a passenger seat,
   an air bag unit disposed in the opening and provided with an air bag to be inflated, an inflator for generating a gas and a casing for receiving the air bag,
   a cover member provided in the opening provided in the instrument panel so as to cover the opening in a manner such that the cover member extends substantially continuously with a surface of the instrument panel, and
   a shelf portion formed on the instrument panel so as to extend toward a passenger seated in the passenger seat, the cover member being provided with a weakened portion which is broken when the air bag is inflated, an upper portion of said cover member being opened upwardly and a lower portion of said cover member being opened downwardly when the weakened portion is broken and the air bag is inflated, the shelf portion extending toward the passenger seat and beyond the lower portion of the cover member at all times so that the passenger is not contacted by said lower portion of said cover member as it is opened, the lower portion of the cover member being smaller than the upper portion of the cover member in width.
2. An air bag system as recited in claim 1 wherein the cover member is opened like a double door.
3. An air bag system as recited in claim 2 wherein at least the lower portion of the cover member is swung inward of a space defined by the instrument panel.
4. An air bag system as recited in claim 3 wherein the lower portion of the cover member is connected with a steering support member through a flexible member so that the lower member is swung inward of the space about a pivot axis defined by the flexible member.
5. An air bag system as recited in claim 1 wherein the lower portion of the cover member is folded as it is opened so that the lower portion of the cover member does not project from the shelf portion formed on the instrument panel when the cover member is opened.
6. An air bag system as recited in claim 1 wherein at least the lower portion of the cover member is moved inward of a space defined by the instrument panel.
7. An air bag system as recited in claim 1 wherein the casing is provided with a breakable cover for covering an opening of the casing.
8. An air bag system as recited in claim 1 wherein the casing of the air bag unit is carried by a steering support member.
9. An air bag system as recited in claim 1 wherein the center line of the air bag unit is extended rearwardly and upwardly.
10. An air bag system as recited in claim 1 wherein the air bag unit is located rearwardly of a defroster.

* * * * *